United States Patent
Tillotson et al.

(10) Patent No.: US 8,174,431 B2
(45) Date of Patent: May 8, 2012

(54) SYSTEM FOR MEASURING TURBULENCE REMOTELY

(75) Inventors: Brian J. Tillotson, Kent, WA (US); Charles B. Spinelli, Bainbridge, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/014,260

(22) Filed: Jan. 26, 2011

(65) Prior Publication Data

US 2011/0140955 A1 Jun. 16, 2011

Related U.S. Application Data

(62) Division of application No. 12/499,869, filed on Jul. 9, 2009, now Pat. No. 7,880,666, which is a division of application No. 11/003,868, filed on Dec. 3, 2004, now Pat. No. 7,598,901.

(51) Int. Cl.
*G01S 13/89* (2006.01)

(52) U.S. Cl. ............... 342/26 B; 342/26 A; 342/180

(58) Field of Classification Search ............. 342/26 A, 342/26 B
See application file for complete search history.

(56) References Cited

U.S. PATENT DOCUMENTS

| | | | |
|---|---|---|---|
| 3,501,641 A | 3/1970 | Krause | |
| 3,514,612 A | 5/1970 | De Graffenried | |
| 3,646,555 A * | 2/1972 | Atlas | 342/26 R |
| 3,856,402 A | 12/1974 | Low et al. | |
| 4,015,257 A | 3/1977 | Fetter | |
| 5,053,773 A | 10/1991 | Mosinski | |
| 5,184,241 A | 2/1993 | Schwemmer | |
| 5,216,477 A | 6/1993 | Korb | |
| 5,831,570 A | 11/1998 | Ammar et al. | |
| 5,940,523 A | 8/1999 | Cornman et al. | |
| 6,070,460 A | 6/2000 | Leslie et al. | |
| 6,184,816 B1 * | 2/2001 | Zheng et al. | 342/26 R |
| 6,366,854 B1 | 4/2002 | Tsuchiya et al. | |
| 6,456,226 B1 * | 9/2002 | Zheng et al. | 342/26 R |
| 6,501,392 B2 | 12/2002 | Gremmert et al. | |
| 6,563,452 B1 * | 5/2003 | Zheng et al. | 342/26 R |
| 6,590,520 B1 | 7/2003 | Steele et al. | |
| 6,591,171 B1 | 7/2003 | Ammar et al. | |
| 6,720,916 B2 | 4/2004 | Christensen et al. | |
| 7,343,099 B2 * | 3/2008 | Wirth et al. | 398/131 |
| 7,394,723 B2 | 7/2008 | Rubin | |
| 7,427,943 B1 * | 9/2008 | Kronfeld et al. | 342/26 B |
| 7,598,901 B2 | 10/2009 | Tillotson et al. | |
| 7,880,666 B2 | 2/2011 | Tillotson et al. | |

OTHER PUBLICATIONS

Kleijer et al. "Characterizing Atmospheric Turbulence with GPS" Harvard-Smithsonian Center for Astrophysics, 16th Symposium on Boundary Layers and Turbulence. Aug. 10, 2004. pp. 1-7.

(Continued)

*Primary Examiner* — Thomas Tarcza
*Assistant Examiner* — Matthew M Barker
(74) *Attorney, Agent, or Firm* — Harness, Dickey & Pierce, P.L.C.

(57) ABSTRACT

A method of predicting turbulence that may involve receiving electromagnetic energy that has traveled along a path subject to the turbulence, with the turbulence altering the electromagnetic energy. A determination may be made as to the alteration caused by the turbulence by filtering the electromagnetic energy as it was received with a velocity of one of a transmitter of the electromagnetic energy or a receiver that received the electromagnetic energy.

17 Claims, 4 Drawing Sheets

OTHER PUBLICATIONS

MacDonald et al. Diagnosis of Three-Dimensional Water Vapor using a GPS Network. Monthly Weather Review. vol. 130. Issue 2. Feb. 2002. pp. 386-397.

Unknown Author. "Atmospheric Optics", Internet web page, Nov. 4, 2004, 6 Pages, www.astron.berkeley.edu/.about.jrg/ay202/node171.html.

Unknown Author. "Effects of Fading and Scintillation on Antenna Tracking Systems", SPL-ACT Wireless Inc., Dorval, Canada H9P 1G1, at least one day prior to Dec. 3, 2004, 9 Pages.

Unknown Author. "What is the Upper Atmosphere, and Why Do We Study It?" SPARG, Internet tutorial article, Nov. 4, 2004, 6 Pages, www.shef.ac.uk/.about.sparc/tutorial.html.

Aldridge, Jr. "The Global Positioning System", The Aerospace Corporation, Los Angeles, CA, at least one day prior to Dec. 3, 2004, 10 Pages.

Ao, Meeham, Hajj, Mannucci, and Beyerle. "Lower-Troposphere Refractivity Bias in GPS Occultation Retrievals", Paper No. 0148-0227/02, Journal of Geophysical Research, at least one day prior to Dec. 3, 2004, 12 Pages.

Aoyama et al. "Mountaintop GPS Observations: Downward Looking GPS Occultation Measurement on the Top of Mt. Fuji", Research Institute for Sustainable Humanosphere, Kyoto Univ., Meteorological Research Institute, Electrical Navigation ResearchInstitute, at least one day prior to Dec. 3, 2004, 36 Pages.

Cornman et al. "The Effect of Turbulence on GPS Signals: Theory and Measurements", National Center for Atmospheric Research USA, at least one day prior to Dec. 3, 2004, 43 Pages.

Cornman et al. "Detection of Upper Level Turbulence Via GPS Occultation Methods", National Center for Atmospheric Research, Boulder, Colorado, at least one day prior to Dec. 3, 2004, 10 Pages.

Unknown Author. "Environmental Risk Assessment"; Internet page; Nov. 13, 2004, 1 Page; www.ce.utexas.edu/prof/maidment/risk/lecture/dmintro.html.

Piironen, "Atmospheric Boundary Layer Structure", located on the internet at http://lidar.ssec.wisc.edu/papers/akp_thes/node6.htm, Mar. 26, 1996, 2 Pages.

Stewart and Langley. "The Statistics of Scintillation Occurrence at GPS Frequencies", Geodetic Research Laboratory, University of New Brunswick, at least one day prior to Dec. 3, 2004, 10 Pages.

Ware, Fulker, Stein, Anderson, Avery, Clark, Droegemeier, Kuettner, Minster and Sorooshian. "SuomiNet: A Real-Time National GPS Network for Atmospheric Research and Education", Bulletin of the American Meteorological Society, vol. 81, No. 4, Apr. 2000, 18 Pages.

Workshop Scientific Programme, OPAC-1 International Workshop, Sep. 16-20, 2002, 5 Pages.

* cited by examiner

SYSTEM FOR MEASURING TURBULENCE REMOTELY

CROSS-REFERENCE TO RELATED APPLICATIONS

This application is a divisional of U.S. patent application Ser. No. 12/499,869, filed Jul. 9, 2009, which is a divisional of U.S. patent application Ser. No. 11/003,868, filed on Dec. 3, 2004 (now U.S. Pat. No. 7,598,901). The entire disclosure of the above applications is incorporated herein by reference.

FIELD

This disclosure relates generally to meteorological sensors and, more particularly, sensors that sense clear air turbulence remotely.

BACKGROUND

Clear air turbulence significantly affects the comfort of passengers on commercial aircraft and has even caused some would be passengers to forego flying due to their fears associated with the turbulence. Because clear air turbulence can occur with little or no warning, the passengers tend to stay in their seats with their seat belts fastened. At times, though, every passenger must get up for comfort and physiological reasons. Therefore, if the aircraft must proceed through the turbulence, it would be useful if the aircrew could alert the passengers to the disturbance before the aircraft encounters it.

Preferably, the aircraft would avoid the turbulence altogether but even that preventative measure requires that the turbulence be detected or predicted before it occurs. While much turbulence (e.g. the turbulence associated with thunderstorms) can be predicted or detected, clear air turbulence can not be detected or predicted by currently available technology. The reason that clear air turbulence cannot be detected is that it consists of masses of air having slightly different temperatures, pressures, and densities moving at various speeds and directions in the atmosphere. The minute differences in these air masses do not reflect radar differently enough to make the radar return from one mass of air distinguishable from the radar return from another mass of air.

While meteorological maps provide flight crews some indication of where turbulence might be expected, these maps are not perfect. First, they tend to become stale within hours and are based on underlying meteorological models that are far from perfect also. Additionally, turbulence occurs across a wide variety of geometric scales. Some turbulent areas can extend for many kilometers, or even hundreds of kilometers (e.g. the turbulent region surrounding the jet stream). Other areas of turbulence occur on the scale of kilometers or fractions of kilometers such as the turbulence associated with the downstream side of a mountain that is subjected to brief wind gusts of significant velocity. Due to their scale, these smaller volumes of turbulence will not appear on the meteorological maps.

In the absence of any better approach, the aviation industry has created a system in which the pilots of each aircraft radio in reports of the clear air turbulence that they encounter on their routes, or "airways." Subsequent aircraft flying the same airway can maneuver in response to these reports but risk encountering turbulence along their detour. Obviously, the first aircrew to fly along a given airway after the airway has been vacant for some time will have no reports on which to base evasive action. Likewise, those aircraft on unplanned detours such as when an airport is too busy to accept arrivals, or is otherwise shut down (by for example severe weather), will have no way to foresee the turbulence along the route.

SUMMARY

In one aspect the present disclosure relates to a method of predicting turbulence. The method may include receiving electromagnetic energy that has traveled along a path subject to the turbulence, with the turbulence altering the electromagnetic energy. A determination may be made as to the alteration caused by the turbulence by filtering the electromagnetic energy as it was received with a velocity, of one of a transmitter of the electromagnetic energy or a receiver that received the electromagnetic energy.

In another aspect the present disclosure relates to a method of predicting turbulence. The method may include receiving electromagnetic energy that has traveled along a path subject to the turbulence, the turbulence altering the electromagnetic energy. The alteration caused by the turbulence may be determined by filtering the electromagnetic energy as it was received with a velocity of one of a transmitter of the electromagnetic energy or a receiver that received the electromagnetic energy. A three dimensional model of the turbulence may then be created.

In still another aspect the present disclosure relates a method of predicting turbulence. The method may comprise receiving electromagnetic energy that has traveled along a path subject to the turbulence, the turbulence altering the electromagnetic energy. The alteration caused by the turbulence may be determined by filtering the electromagnetic energy as it was received with a velocity of one of a transmitter of the electromagnetic energy or a receiver that received the electromagnetic energy. The velocity may include at least one of a linear velocity or an angular velocity. A direction may be determined between the receiver and the transmitter. A three dimensional model of the turbulence may be created.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 illustrates a global system for the detection of clear air turbulence in accordance with the principles of the present disclosure;

FIG. 2 schematically illustrates a radio receiver of a preferred embodiment of the present disclosure;

Corresponding reference numerals indicate corresponding parts throughout the several views of the drawings.

DETAILED DESCRIPTION OF VARIOUS EMBODIMENTS

Figure 1:
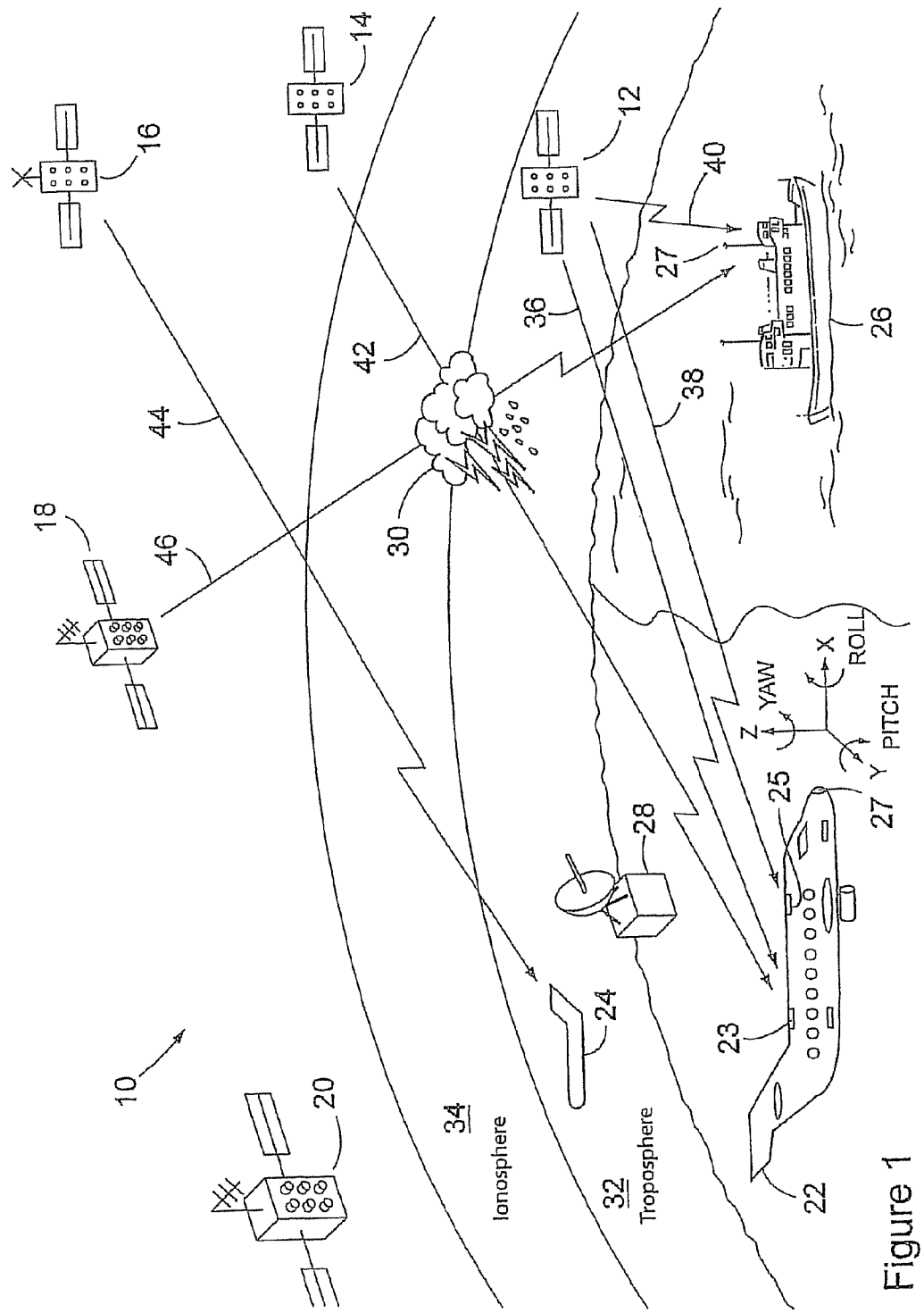

The present disclosure in one implementation relates to a system for detecting turbulence along a path that is subject to turbulence. The system may make use of at least one transmitter to transmit electromagnetic (EM) energy along the path and at least one receiver to receive the EM energy. At least one of the transmitter and the receiver moves along the path. The receiver may have an antenna responsive to incident EM energy to produce a received signal, and an input for accepting a velocity signal indicating a velocity that the receiver or the transmitter is moving at. The receiver processes the received signal using the velocity signal to remove a shift associated with the received signal because of relative motion between a source of the EM energy and the receiver or transmitter that is moving along the path. Thus, the receiver determines an alteration of the EM energy caused by the turbulence and outputs a signal indicative of the turbulence.

In another implementation the present disclosure relates to a system for detecting turbulence along a path being traveled by a mobile platform. The system may include at least one transmitter to transmit electromagnetic energy along the path, and at least one receiver located on the mobile platform to receive the electromagnetic energy as the mobile platform travels along the path. The receiver may include an antenna responsive to incident electromagnetic energy to produce a received signal, and an input to accept a velocity signal that is representative of a velocity at which the one of the receiver and the transmitter is moving along the path. The receiver is adapted to process the received signal using the velocity signal to remove a shift associated with the received signal because of relative motion between a source of the electromagnetic energy and the one of the receiver and the transmitter that is moving along the path. In this manner the receiver determines an alteration of the electromagnetic energy caused by the turbulence. The receiver is adapted to output a signal that is representative of the turbulence.

In another aspect a system is disclosed for detecting turbulence along a path being traveled by a mobile platform. The system may include at least one transmitter to transmit electromagnetic energy along the path, and at least one receiver located on the mobile platform to receive the electromagnetic energy as the mobile platform travels along the path. The receiver may include an antenna responsive to incident electromagnetic energy to produce a received signal, and an input to accept a velocity signal that is representative of a velocity at which the one of the receiver and the transmitter is moving along the path. The receiver is adapted to process the received signal using the velocity signal to remove a shift associated with the received signal because of relative motion between a source of the electromagnetic energy and the one of the receiver and the transmitter that is moving along the path. In this manner the receiver determines an alteration of the electromagnetic energy caused by the turbulence. The receiver is also adapted to output a signal that is representative of the turbulence. A processor receives the output signal and creates a three dimensional model of the turbulence using the output signal.

Apparatus and methods for remotely sensing turbulence, particularly a clear air turbulence meter, provide a system that measures atmospheric turbulence along a line of sight between a receiver and a satellite. The system uses alterations to a signal (that include, but are not limited to changes in intensity, phase, and frequency) that is transmitted from the satellite to the receiver to make the turbulence measurement. In one embodiment, the receiver is a GPS receiver that estimates the contribution of ionospheric scintillation to the signal alterations by using the GPS L1 and L2 bands. Preferably, these ionosphere effects are removed from the alteration to isolate the effects of tropospheric turbulence on the signal.

Other embodiments are adapted for use on land and marine vehicles and include velocity sensors such as inertial measurement units that enable the receiver to adjust the turbulence measurement to account for the motion of the vehicle. In the alternative, the system can include an input for receiving velocity information from the vehicle. These vehicle-adapted systems can determine velocity-induced phase shifts and Doppler effects from the velocity of the vehicle and remove these effects from the measured variations of the signal. Also, the system can include an input to receive the heading of the vehicle to enable the system to determine the direction to each GPS satellite currently in view. The direction can be determined relative to the aircraft heading or relative to the ground (or Earth). Further, the system can adjust the measured turbulence estimate for crosswind effects (i.e. apparent turbulence introduced into the measurement because of the motion of the receiver relative to the turbulent volumes of air). Moreover, signals from more than one satellite constellation (e.g. GPS, GLONASS, and Galileo) can be used by the receiver to make the measurements. Using more than one constellation improves the availability of transmitted signals, gives better coverage of the atmosphere, and improves the accuracy of the turbulence measurements. The turbulence measurements can be conveyed to end users such as the aircrew, air traffic controllers or computers, or other aircraft. The forms in which the turbulence measurements can be conveyed include audible alarms, overlays of turbulence intensity on aircrew station displays, or overlays of turbulence intensity on a map. Thus, airlines operating in accordance with the principles of the present disclosure will provide smoother flights with fewer occurrences of passengers being advised to return to their seats because of the possibility of turbulence. Moreover, the number of times when the advisories are based on inaccurate predictions (e.g. "false alarms") wilt be reduced. Likewise, detours of aircraft around turbulence will be avoided thereby reducing fuel consumption.

In a second embodiment, the present disclosure provides a receiver of electromagnetic energy (that travels along a path that is subject to turbulence). The receiver includes an input, an output, and a circuit in communication with the input and the output. The input receives a first signal that is representative of the electromagnetic energy as it is received. The circuit accepts the first signal and a second signal that is representative of a velocity of a mobile platform. Also, the circuit adjusts the first signal using the second signal to determine an alteration of the electromagnetic energy caused by the turbulence thereby eliminating alterations caused by the velocity of the mobile platform. In one embodiment the circuit determines the alteration caused by only the tropospheric turbulence. The output generates a third signal that is representative of the turbulence.

The receiver may include a GPS (Global Positioning System), or similar circuit, and accepts a fourth signal that is representative of a heading of the mobile platform. From the fourth signal, the receiver determines a direction to the source of the electromagnetic energy. Moreover, the circuit may accept yet another signal that is representative of the electromagnetic energy from a second receiving location. In these embodiments, the circuit determines from that signal a second alteration of the energy caused by the turbulence. In another embodiment, the circuit correlates the two measurements of the alteration caused by the turbulence. More particularly, the receiver correlates the two measurements with respect to the time it took for an antenna at the second location to move to the first location.

In a third embodiment the present disclosure provides a mobile platform that includes an antenna, a velocity sensor, and an electromagnetic energy receiver. The antenna receives the electromagnetic energy (that has traveled along a path subject to turbulence) while the sensor senses the velocity of the mobile platform. Using the sensed velocity, the receiver filters the as-received electromagnetic energy to determine an alteration to the energy that was caused by the turbulence. The mobile platform may also provide to the receiver a signal representing a heading of the platform so that the receiver can determine a direction to the source of the energy. Also, the mobile platform (e.g. an aircraft, a land vehicle, or a marine vehicle) can include a second antenna to receive the electromagnetic energy thereby allowing the circuit to make a second measurement of the turbulence. Additionally, the circuit may correlate the two measurements with respect to the amount of time it took for the second antenna to move to the location where the first antenna received the energy. Preferably, the antennas are located on a sidewall of the mobile platform.

In another embodiment the present disclosure provides a system for detecting turbulence. In this current embodiment the system includes at least one mobile platform, a sensor that determines the velocity of the at least one mobile platform, at least one electromagnetic energy transmitter, and at least one receiver. The transmitter transmits the electromagnetic energy across a path that is subject to turbulence and the receiver receives the energy (even if the transmitter is near the horizon as seen by the receiver). At least one of the transmitters or receivers is on the mobile platform. Again, the receiver determines an alteration to the energy that is caused by the turbulence. When the receiver determines the alteration the receiver may also associate a time, a location, and a direction with the determined alteration. Preferably, the system includes a processor that creates a three dimensional model (e.g. a computer aided tomographic model) of the turbulence from the measurements made by the receivers. In turn, a network may be used to distribute the model to subscribers in a publish-subscribe architecture. In another preferred embodiment the model includes a statistical confidence interval. Moreover, the model may be supplemented with data from other sources such as air data sensors, inertial sensors on mobile platforms, meteorological sensors, and meteorological predictions. The system may be configured to sense the turbulence over a pre-selected geographic region such as an airport approach or departure path.

A method of measuring turbulence is also provided. The method in one form may include receiving electromagnetic energy that has traveled along a path subject to the turbulence. The method may also include determining the alteration to the energy caused by the turbulence by filtering the electromagnetic energy (as it was received) with a signal that represents the velocity of either the transmitter or the receiver. An alteration caused by the ionosphere may also be filtered from the alteration to the electromagnetic energy. The method may include determining a direction between the receiver and the transmitter. A determination may also be made of the alteration caused by the turbulence as measured at a second location. Further, a three-dimensional model of the turbulence may be created and distributed to subscribers to the model.

It will be appreciated that many modern aircraft use radio positioning signals broadcast from satellites (e.g. GPS or GLONASS) for navigation. Atmospheric turbulence can cause the GPS receivers to occasionally lose lock with the signals by corrupting, or altering, the signal to an extent sufficient to render the receiver temporarily inoperative. The problem becomes more pronounced when the transmitting satellite, as seen by the receiver, nears the horizon. Not only does the signal have to traverse a significantly longer path through the atmosphere, but the signal path is likely to penetrate deeply into the troposphere where turbulence can be much more pronounced than in the higher portions of the atmosphere. Also, as the signal path nears the ground, multipathing can occur which further degrades the signal quality. Because turbulence has previously been seen as a problem to be avoided, the receiver antennas are typically configured to reject signals with low elevation angles relative to the horizon.

According to the principles of the present disclosure, though, the altered signals carry an indication of the amount of turbulence through which the signals have passed. While any one signal only conveys information regarding the turbulence along its path, the large number of GPS receivers and satellites currently in use provide a plethora of turbulence measurements along the numerous paths between these devices. By a process similar to tomography (e.g. computer aided tomography or CAT), these turbulence measurements can be used to create a three-dimensional model of the turbulence in the atmosphere.

Before turning to a more detailed description of the disclosure, it is useful to discuss the structure of the atmosphere as it relates to turbulence. The lowest portion of the atmosphere is the troposphere and is the volume of air where most commercial and military aviation occurs. The troposphere begins at the surface of the Earth and, during the day, is composed of a surface boundary layer, a mixing layer, an entrainment layer, and the lowest reaches of the "free" atmosphere. The surface boundary layer, mixing layer, and entrainment layer typically extend up to about 1 to 3 kilometers. These layers are sometimes collectively referred to as the planetary boundary layer because effects of frictional drag with the surface of the Earth can be observed in these layers. In contrast to these lower levels of the atmosphere, the effects of the ground are negligible, or nonexistent, in the "free" atmosphere.

Because it is the layer of the atmosphere in direct contact with the Earth, the surface boundary layer (which is about 10% of the planetary boundary layer) is dominated by mechanical shear between the air and the ground and outright obstructions to the movement of the air (e.g. mountains or buildings). These interactions give rise to local eddies on many scales from millimeters to many hundreds of kilometers. Solar heating and radiative cooling of the air and the ground cause areas of convection to develop thereby creating up and down drafts. Thus, winds (i.e. the turbulence) in the surface boundary layer have components in all three dimensions and are not a function of height. Further, strong vertical gradients exist in the properties (e.g. temperature, pressure, and humidity) of the air in this layer.

Being above the surface boundary layer, the mixing layer is influenced by the ground to a lesser extent than the surface boundary layer. The winds in the mixing layer are characterized by large scale eddies that are generally on the scale of many kilometers, or larger. Additionally, plumes of heated air rising from the surface boundary layer and masses of cooler air sinking from the entrainment layer (i.e. tubules) also exist in a generally random distribution throughout the mixing layer. Thus, much of the small-scale chaotic flow of the surface boundary dissipates with altitude.

The entrainment layer lies just above the mixing layer. In the entrainment layer, the rising plumes of heated air reach thermodynamic equilibrium with their surroundings and stop rising. Cumulus clouds therefore form at the tops of these thermal plumes which can reach the top of the troposphere in extreme cases (e.g. severe thunderstorms). Adjacent to the warm rising plumes of air, masses of cooler denser air are displaced and sink into the mixing layer.

At night heating from solar radiation stops as radiative cooling of the ground and air begins to predominate. Thus, the energy that drives the daytime turbulence fades and allows friction with the surface to stabilize a layer of air near the ground. Another layer of air above the "stable layer" contains residual turbulence left behind by the daytime atmosphere. The "residual" layer generally corresponds to the mixing and entrainment layers.

Thus, in general, turbulence occurs when the cells of air in the mixing layer, called turbules, rise and fall through the atmosphere at different rates due to density differences between the turbules and the surrounding air. Sometimes the turbulence is visible, or detectable with radar, due to precipitation entrained in (or precipitating from) the turbulent air. Often, though, no detectable indication of the turbulence occurs so that when an aircraft encounters the turbulence, it appears to come from the "clear air."

The density differences between the turbules and surrounding air are largely a function of temperature, pressure, and humidity although other properties of the air in the turbule also vary from that of the surrounding air. Because of the differing properties, the index of refraction of the air in the turbules differs from the index of refraction of the nearby air in the mixing layer. Ao has shown that the index of refraction "n" is related to the properties of air as follows:

$$(n-1) \times 10^6 = a_1 P/T + a_2 P_w/T^2$$

where T is the air temperature, P is the air pressure, $P_w$ is the water vapor pressure (i.e. a measure of humidity), $a_1$ is 77.6 K mbar$^{-1}$ and $a_2$ is 3.73×10$^5$ K$^2$ mbar$^{-1}$. [Ao, C. O. et al., *Lower-Troposphere Refractivity Bias in GPS Occultation Retrievals*, Journal of Geophysical Research, 108 (D18), Pages 1-12.] As a result, the turbules refract electromagnetic waves as the waves pass through the turbules. The amount of refraction occurring along a wave's (or signal's) path therefore changes as turbules move into or out of the signal path. The changing amount of refraction causes several measurable alterations to the signal. More particularly, these alterations include changes in the phase, the intensity, and the frequency of the wave induced by changes to the path that the signal travels.

Moreover, because the signal path is continuously changing, the signal will appear to be arriving from different paths. Because the paths have different lengths, it is possible for one instantaneous portion of the wave to partially overtake another instantaneous portion of the wave signal. Thus, the portions of the wave may interfere either constructively or destructively. The result is higher or lower signal intensity, respectively, at the receiver. Thus, rapid variations in intensity are therefore an indicator of turbulence along the signal path.

The changing signal paths also give rise to frequency shifts of the signal. These frequency shifts occur because the effect of the changing path lengths is the same as if the satellite were actually retreating at the velocity with which the path length changes. This phenomenon is similar to the Doppler effect caused by a transmitter and receiver moving relative to each other. Thus, rapid changes in frequency also indicate turbulence along the signal path. Previously available GPS receivers typically measure frequency and use the detected Doppler effect to compute the receiver's heading and speed. However, these previous GPS receivers, by design, smooth out short-term fluctuations to give an accurate average receiver velocity. Thus, the previously available GPS receivers treat the fluctuations as a problem whereas the receivers of the current embodiment include frequency detectors that pick up the signal prior to the averaging function and provide another indication of turbulence.

Turning now to the phase shifts caused by the turbules, these shifts also occur because at one instant the signal arrives from one path and at the next instant it arrives from a slightly different path. Because the different paths will almost always have different lengths, the signal arriving at one instant will have traveled a different distance than the signal arriving at another instant. The difference in path length causes the signal to undergo a phase shift at one time relative to the other time. Thus, variations in phase are yet another indicator of turbulence along the signal path.

Tropospheric turbulence is not the only source of alteration to (i.e. scintillation of) signals transmitted to, or from, space. The Earth's ionosphere also alters the signals in a manner that is strongly dependant on frequency. Thus, the receivers of the present disclosure use signals having different frequencies to measure the ionospheric effects on the signals. As a result, the receivers can remove the ionospheric alterations from the signals thereby leaving only the alterations that are due to tropospheric effects (i.e. troposphere turbulence).

In a preferred embodiment the disclosure combines the use of high-quality GPS receivers onboard aircraft to measure signal quality with a computerized navigation system to compute the relative positions of the aircraft and satellites. The receivers use the GPS signal quality to estimate turbulence between the aircraft and the satellites. If strong turbulence is detected in an aircraft's path, a warning may be issued to the aircrew. Otherwise, the turbulence measurements can be collected and used to build a three dimensional model of the atmosphere that shows where turbulence is occurring and the degree to which it is occurring.

Referring to the accompanying drawings in which like reference numbers indicate like elements, FIG. 1 illustrates a global turbulence measuring system 10 constructed in accordance with the principles of the present disclosure.

The exemplary system 10 shown in FIG. 1 includes a constellation of satellites 12, 14, 16, 18, and 20, a plurality of mobile platforms 22, 24, and 26, and a ground station 28 distributed in such a manner as to detect the volumes of turbulence 30 that might occur in the atmosphere. While the turbulence 30 is shown as a cumulonimbus cloud (i.e. a thunderstorm) the principles of the present disclosure apply equally well to turbulence that bears no visible indication of its presence and to turbulence that cannot be detected by radar. Also, FIG. 1 shows the troposphere 32 (extending up to an altitude of about 11 miles) and the ionosphere 34 (extending up to an altitude of about 400 miles).

The satellites 12, 14, 16, 18, and 20 may be any satellite that transmits signals in the form of electromagnetic energy (e.g. radio frequency energy) generally toward the Earth or any other celestial body having an atmosphere. Preferably, the satellites are components of a constellation of satellites such as a system for providing global positioning services (e.g. the Global Positioning System, GLONASS, or Galileo systems), a system for providing telecommunications (e.g. the IRIDIUM®, GLOBALSTAR®, Intermediate Circular Orbit (ICO®), ORBCOMM®, or TELEDESIC® satellite communication systems), or even a collection of unrelated satellites. Likewise, the particular mobile platforms 22, 24, and 26 used are not critical. But exemplary mobile platforms include aircraft 22 and 24 and ships 26 as well as other air, space, marine, and land vehicles. Preferably, each satellite carries a transmitter to broadcast signals for receipt by receivers at the terrestrial portions 22, 24, 26, and 28 of the system 10 although the location of the receivers and transmitters can be reversed or interchanged without departing from the scope of the present disclosure.

The transmission of the signals between the transmitters and receivers is illustrated by a variety of signal paths in FIG. 1. For instance, satellite 12 is shown transmitting two signals received by the aircraft 22 and one signal received by the ship 26 via, respectively paths 36, 38 and path 40. Satellite 14 is also shown transmitting to the aircraft 22 via path 42. Likewise, satellite 16 is transmitting to the aircraft 24 via path 44 and satellite 18 is transmitting to the ship 26 via path 46. As is apparent from FIG. 1, each of the receiving portions of the system 10 can receive one, or more, signals.

The majority of these paths 36, 38, 40, 42, 44, and 46 will pass through both the ionosphere 34 and the troposphere 32 while being altered by conditions in each of these portions of the atmosphere. These alterations will typically include instant-to-instant phase shifts, frequency shifts, and intensity changes in the signal as it is received at the terrestrial portions 22, 24, 26, and 28 of the system 10. Many portions of the system 10 move. Thus, the paths 36, 38, 40, 42, 44, and 46 will sweep through the atmosphere forming curvilinear three-dimensional surfaces along which the signals travel during the time that any pair of transmitters and receivers are visible to one and other. As the mobile components of the system 10 move, the paths will encounter varying degrees of turbulence 30. For example, paths 36, 38, 40, and 24 are shown traversing relatively stable portions of the atmosphere while paths 42 and 46 are both shown penetrating the volume of turbulence 30 albeit at different locations and angles. Thus, the turbulence 30 will alter the signals traveling on the paths 42 and 46 to a greater extent than the atmosphere will alter the signals that travel on the other paths 36, 38, 40, and 44.

Figure 2:
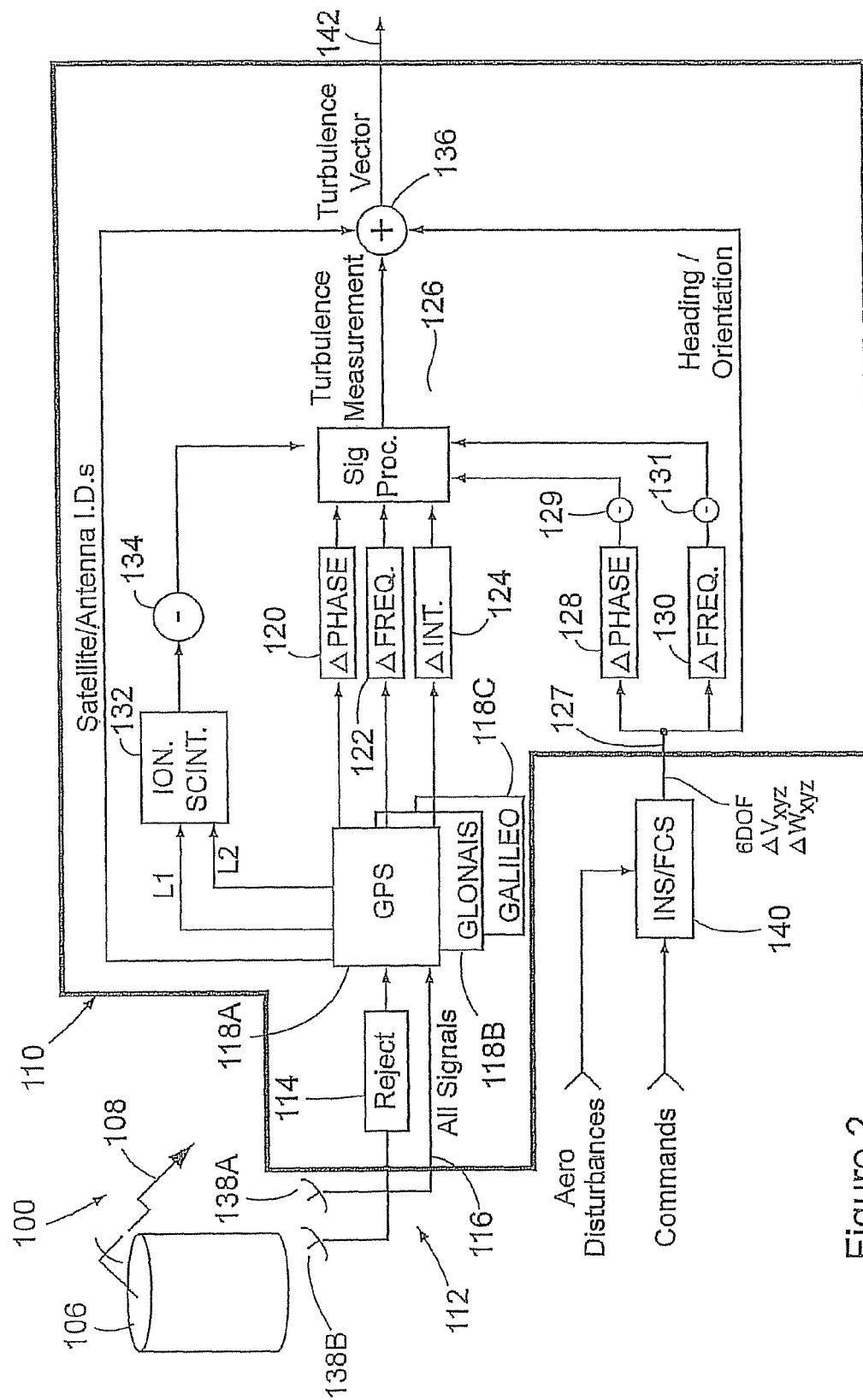

With reference now to FIG. 2, a receiver 110 constructed in accordance with a preferred embodiment of the present embodiment is illustrated in block diagram form. For perspective, a simplified system 100 is also shown and includes a satellite or transmitter 106 broadcasting a signal 108 to the exemplary receiver 110. The receiver 110 includes a number of inputs, outputs, and components as follows: a transmitted signal input 112, a signal rejector 114, a signal bypass 116, a signal conditioner/demodulator 118, a phase detector 120, a frequency detector 122, an amplitude or intensity detector 124, and a signal processor 126. The receiver 110 also includes an ionospheric turbulence detector 132, a related inverter 134, and a signal direction finder 136. To interface with systems onboard a mobile platform, the receiver 110 also includes a mobile platform systems input 127, a phase shift estimator 128, a frequency shift estimator 130, and a pair of related inverters 129 and 131. The components of the receiver 110 (and their equivalents) are interconnected with each other as shown or can be implemented in software. Further, the receiver 110 communicates with one, or more, antennas 138 via the input 112 to receive the signals from the satellite 106. Also, the receiver 110 communicates with the INS (Inertial Navigation System) and FCS (Flight Control System) 140 of the mobile platform via the input 127. As will be described, the receiver 110 generates a turbulence vector at an output 142.

In operation, the transmitter 106 transmits an electromagnetic signal 108 that travels along a path that is subject to turbulence. The turbulence alters the signal 108 thereby causing phase shifts, frequency shifts, or changes to the intensity (i.e. fading and enhancement) of the signal as it is received at the antenna 138. The antenna 138 guides the signal to the signal input 112. If the transmitter 106 is too close to the horizon, an antenna properly designed for positioning applications will typically reject the signal 108 due to the possibility that noise may corrupt the incoming signal. This feature is shown schematically at the rejector 114 even though no component that is separate from the antenna 138 is usually required. The present disclosure seeks these low-elevation, noisy signals 108, in particular, because they bear useful indications of the turbulence 30 (see FIG. 1) along the signal's 108 path through the atmosphere. Thus, the bypass 116 schematically shows the antenna 138 communicating all signals 108 to the signal conditioner 118 even though the signals 108 may be close to the horizon. Again, the bypass function 116 for the noisy signals is typically a characteristic of the antenna 138 rather than a component separate from the antenna 138.

The signal conditioner 118 of FIG. 2 could be divided into two portions: one portion for conditioning the relatively noise-free signals and generating position data and another portion conditioning all signals and supporting the generation of turbulence data. At appropriate nodes within the signal conditioner 118, signals are picked up and communicated to the detectors 120, 122, and 124. By examining the signal 108, the detectors 120, 122, and 124 detect, respectively, phase shifts, frequency shifts, and fading or enhancement of the signal 108. The magnitude of these alterations and the rates at which they are detected are fed to the signal processor 126 (or an equivalent analog circuit) that converts the data to an indication of the amount of turbulence along the path that the signal 108 took in reaching the antenna 138. Generally, the turbulence will be proportional to a combination of the alterations to the signal 108 caused by the turbulence.

Adjustments may also be made to the turbulence measurements made by the receiver 110 to account for the motion of the mobile platform (i.e. the antenna 138) and for ionospheric effects on the signal 108. The motion of the antenna 138 is caused by a combination of the velocity of the mobile platform (in any combination of the x, y, and z dimensions) as well as the rotation of the mobile platform about its roll, pitch, and yaw axes. Thus, the received signal may include alterations (particularly phase and intensity variations) caused by the motion of the antenna 138. Accordingly, the INS/FCS system 140 provides the receiver 110 a signal that conveys the 6 degree of freedom (6 DOF) motion of the mobile platform to the receiver 110 via the input 127. A phase shift estimator 128 and a frequency shift estimator 130 act on the velocity data to determine the phase and frequency alterations introduced into the received signal because of the mobile platform motion. More particularly, the steady-state linear velocity of the aircraft 122 and the associated Doppler effect is easily determined by the frequency estimator 130. Because the steady state velocity is relatively constant, any phase difference introduced by the steady state velocity generally will contribute little to the measured turbulence in this manner. To the extent that the mobile platform velocity causes a phase shift, though, the phase shift is determined from the velocity by the phase shift estimator 128. Similarly, the phase shift estimator 128 determines the phase shift caused by the acceleration of the mobile platform. Again, the phase difference arises because the signal arriving at one instant travels a slightly different distance than a signal arriving at the next instant, with the distance changing in accordance with the acceleration. Thus, the phase of the signal appears to shift by an amount determined by the travel of the mobile platform between the arrival of the signals at the different times.

In contrast to the linear velocity of the aircraft, the rotational velocity is subject to more rapid changes. These angular accelerations arise from several sources including control inputs, local turbulence experienced directly by the aircraft, and aerodynamic forces acting on the aircraft. Thus, the phase and frequency shift estimators 128 and 130 use knowledge of the antenna locations and orientation on the aircraft along with the sensed rotational motion to determine the Doppler and phase shifts caused by the instantaneous linear velocity and acceleration arising from the rotation. The inverters 129 and 131 invert the resulting signals and communicate the result to the processor 126. The processor 126 then adjusts the signals that convey the magnitudes and rates of the alterations generated by the phase, frequency, and intensity detectors 120, 122, and 124 to remove the alterations caused by the motion of the antenna 138. The adjustment of the signal can be by way of, for example, a filtering algorithm. The adjusted magnitude and rate signals are then converted by the processor 126 to a measurement of the turbulence along the signal 108 path through the atmosphere. Accordingly, the processor 126 of FIG. 2 generates a measurement of the turbulence that is corrected for the motion of the antenna 138.

In addition to the alterations induced in the signal by tropospheric turbulence, the ionosphere also alters the signal via interactions between the signal and the charged particles in the ionosphere. Because ionospheric scintillation is strongly frequency dependent, the ionospheric scintillation detector 132 can, by comparing the L1 and L2 GPS signals 108 (recall that the GPS system uses one signal at the L1 frequency of about 1575 MHz and another signal at the L2 frequency of about 1228 MHz) to detect the amount of scintillation introduced into the signal 108 by the ionosphere. The inverter 134 inverts the output from the ionospheric scintillation detector 132 and communicates the inverted signal to the processor 126. The processor 126 uses the inverted ionospheric scintillation signal to remove the effects of the ionospheric scintillation from the turbulence estimate. Thus, the processor 126 generates a signal indicative of the tropospheric turbulence encountered by the signal 108 that is filtered of the effects of the antenna motion and of the ionosphere.

Ionospheric scintillation is relatively constant with respect to elevation angle (i.e. the apparent height of a satellite above the horizon) whereas tropospheric scintillation varies strongly with elevation angle. This relationship between elevation angle and tropospheric scintillation is an inverse relationship. Accordingly, ionospheric scintillation predominates at high elevation angles and tropospheric (turbulence induced) scintillation predominates at low elevation angles. Thus, in a preferred embodiment, the antennas 138 and receivers 110 are adapted to accept low elevation angle (less than about the 5 degree default mask angle of the GPS system) signals.

At the next stage of the receiver 110 (as illustrated in FIG. 2), additional information is associated with the turbulence measurement. In particular, the direction finder 136 receives heading and orientation information from the mobile platform INS/FCS system 140 via the input 127. Additionally, the direction finder 136 receives information from the signal conditioner 118 regarding which antenna 138A or 138B received the signal 108 and which satellite 106 generated the signal. These antennas 138A and 138B correspond to the two antennas 23 and 25 on the aircraft 22 of FIG. 1. Knowing the location of each antenna on the aircraft 22 and the orientation of the antenna relative to the aircraft, the direction finder 136 determines the direction to the satellite 106 that transmitted the signal 108 received by the antenna 138A or 138B. The direction finder 136 of the current embodiment associates the direction and the time that the signal 108 was received with the turbulence measurement which, it receives from the processor 126. Accordingly, the output generated by the direction finder 136 is a time varying vector defined by the amplitude of the turbulence measurement (from the processor 126) and the direction (in three dimensions) found by the finder 136. This turbulence vector reflects the total amount of tropospheric turbulence along the signal 108 path at the time of the signal's 108 receipt.

FIG. 1 also shows another preferred embodiment that includes the aircraft 22 which has three antennas 23, 25, and 27. Each of the antennas communicates with a receiver, such as the receiver 110 of FIG. 2, for the measurement of turbulence. As shown, the aircraft 22 is flying toward the right and has the antenna 23 and 25 spaced apart from each other by a distance generally in the direction of the aircraft's velocity. The antennas 23 and 25 are preferably on the sidewalls of the aircraft 22 and look abeam from the aircraft 22. The antenna 27 is located at the nose of the aircraft 22 and faces forward along the direction of travel. As the aircraft 22 moves, the paths 36 and 38 between the antennas 23 and 25 and the satellite 12 also move while the receiver 110 continues making turbulence measurements. As the paths 36 and 38 move, the paths move into, through, and out of the various areas of turbulence 30 in the atmosphere. In contrast, because the antenna 27 looks forward, the paths leading to the antenna 27 from most satellites will move very little as a result of the aircraft's motion (although they will shorten as the aircraft moves toward the satellite). Accordingly, the side facing antennas 23 and 25 will receive signals that have more apparent turbulence induced variations than the signals received by the forward facing antenna 27.

Over a period of time $\Delta t$, the aircraft 22 moves by a certain distance from the location where the leading antenna 25 received the signal along path 38 to a location where the trailing antenna 23 receives the signal along the path 36 which is located where path 38 was located. For an antenna separation of about 10 meters at a typical aircraft cruise speed of 200 meters per second, $\Delta t$ is approximately 50 milliseconds. Turbules large enough to cause measurable changes in the GPS signal typically vary on a much slower time scale. Thus, aside from changes in the turbules themselves, the trailing antenna 23 will receive the signal at the end of the period $\Delta t$ with approximately the same alterations made to it by the turbules that (previously) the leading antenna 25 received at the beginning of the period $\Delta t$. That is, the measurement of turbulence made by antenna 25 along path 38 will be about the same as the measurement of turbulence made by the antenna 23 along path 36.

In reality, various error sources will likely cause mismatches between the measurements made by the two antennas 23 and 25. However, most of the error sources will either be truly random (e.g. thermal noise in the receiver 110) or they will be common to both antennas (e.g. timing variations aboard the GPS satellite). In the latter case, the errors will be simultaneous but will occur at different locations. That is, simultaneous errors common to both antennas 23 and 25 will affect the measurement made by antenna 23 along path 36 and will affect the measurement made by antenna 25 along path 38. During both the previous and subsequent measurement cycles, the measurements along both paths 36 and 38 will likely be unaffected.

To eliminate the random and common mode errors, the receiver 110 correlates the two time-sequences of data resulting from the measurements made by the two antennas 23 and 25. One of the two time-sequences includes the samples of turbulence-related data (e.g. amplitude changes, phase shifts, or frequency shifts) from the leading antenna 25. The other time-sequence of turbulence data is collected from the trailing antenna 23 and delayed with respect to samples in the first sequence taken at the same location by $\Delta t$. Accordingly, the magnitude of the coefficient of correlation, $r(\Delta t)$, for these two time-sequences is maximized for parameter changes caused by turbules on the scale of the spacing between the two antennas 23 and 25. The correlation coefficient with $\Delta t \neq 0$ also minimizes the effect of random errors in the two sets of data.

In a preferred embodiment, the receiver 110 of FIG. 2 continuously determines the coefficient of correlation, $r(\Delta t)$, and provides an output signal proportional to $r^2(\Delta t)$. This output can be used as an indicator of turbulence along the line of sight to the satellite and is more robust against error than an indicator based on a single antenna (e.g. antenna 23 alone). In other preferred embodiments, the disclosure provides more than two GPS antennas along the length of a large aircraft. Because many aircraft already have redundant antennas, little or no equipment need be added to these aircraft. In these embodiments, the receiver 110 computes a coefficient of correlation for the measurement data sets obtained by all of the antennas. The time-sequence for each antenna is delayed by an appropriate interval so that all data sets cover the same signal path.

In another alternate embodiment, the disclosure uses signals from satellites other than those satellites that are designed to provide precise navigation signals. Examples include communication and weather satellites. Candidate communication satellites include the satellites in the IRIDIUM® satellite constellation, the GLOBALSTAR® satellite constellation, the ICO® satellite constellation, and similar constellations. One of the advantages of using these satellites is that they are more numerous than positioning satellites so they provide more frequent opportunities to measure turbulence along a particular line of sight or above a particular region. For embodiments using communications satellites it is preferred that the receiver correlate the signals from two or more antennas so as to reject variations in the phase and frequency of the transmitted signals that can be caused by timing errors in the satellites' clocks.

Figure 3:
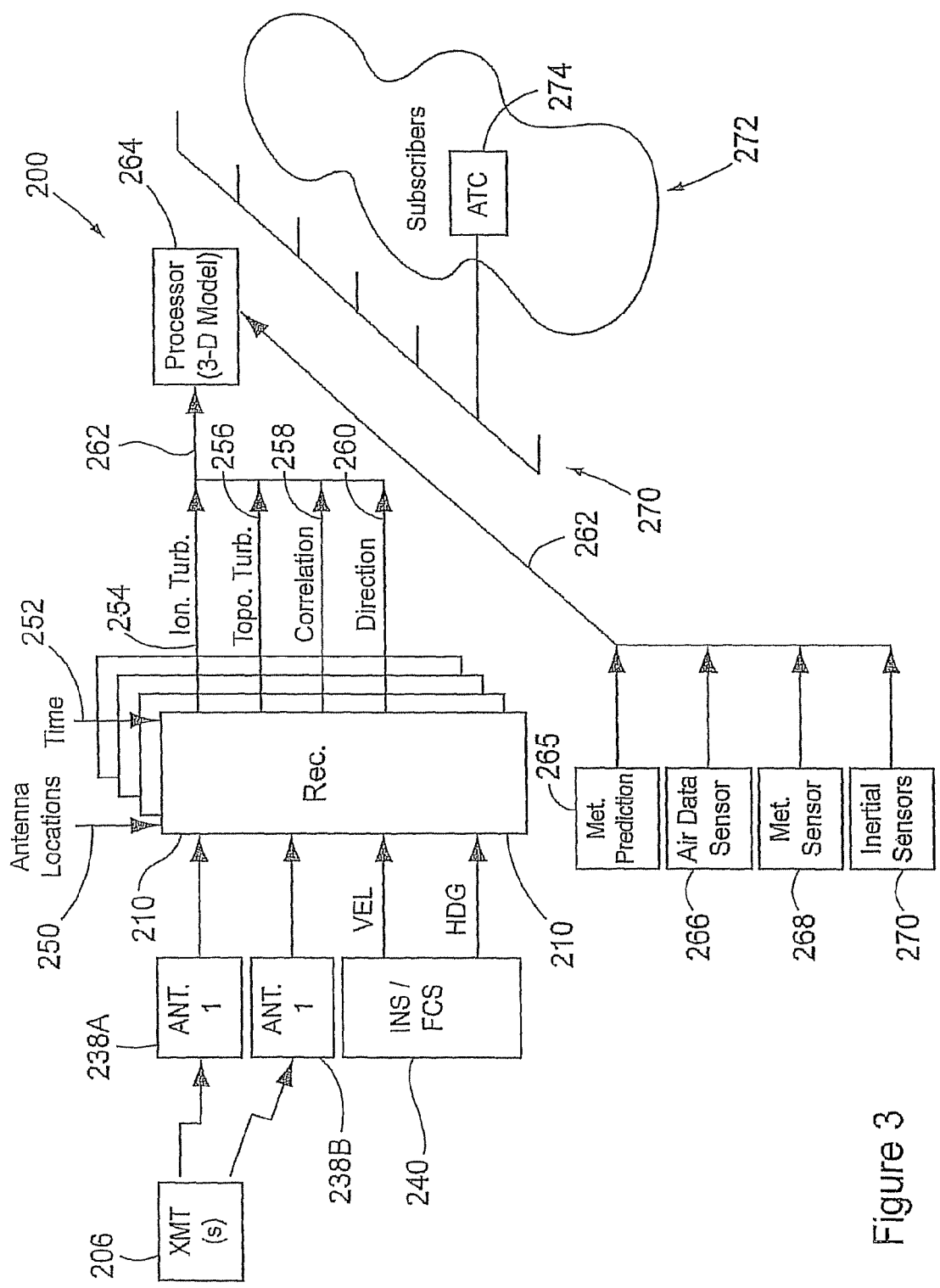
FIG. 3 illustrates a system architecture for the system of FIG. 1.

With reference now to FIG. 3, another system 200 constructed in accordance with the principles of the present disclosure is illustrated. FIG. 3 differs from FIG. 2 by generally showing how the system 200 distributes and uses the turbulence vectors generated by the receivers 210 whereas FIG. 2 generally illustrates how the receivers 110 generate the turbulence vectors. Briefly, the transmitter 206 transmits signals to the antennas 238. Systems 240 on the mobile platforms provide the receivers 210 with information regarding the mobile platforms' velocity, heading, and orientation. From these signals, the receivers 210 generate the turbulence vectors while, preferably, adjusting the as-received signals for the velocity of the mobile platforms on which the receivers 210 are situated. FIG. 2 also illustrates the receivers 210 providing separate signals 254, 256, 258, and 260 carrying information pertaining to, respectively, the ionospheric scintillation, the tropospheric turbulence, the correlation between different measures of the tropospheric turbulence, and the directions in which each of the turbulence measurements was made.

FIG. 3 also shows several additional aspects of the current embodiment including a network 262, a computer or processor 264, a meteorological prediction model 265, a set of air data sensors 266, a set of meteorological sensors 268, a set of inertial sensors 270, and a population of subscribers 272 that includes the Air Traffic Control System 274. The processor 264 receives the numerous turbulence vectors and related information over the network 262 which may include an airborne network such as the CONNECTION BY BOEING$^{SM}$ system. From the turbulence information, the processor 264 creates a three-dimensional model of the turbulence measured by the numerous receivers 210. Preferably, the processor 264 executes a tomography algorithm on the collection of turbulence vectors to yield the three-dimensional model.

Tomography is a set of processes for determining the two-dimensional or three-dimensional distribution of a quantity from a set of measurements of that quantity taken along paths through an object or volume. Typical products of tomographic processes include cross sectional depictions of three dimensional objects. An example of tomography is Computerized Axial Tomography (CAT), the basis of medical CAT scans. During a CAT scan, the quantity measured is x-ray absorptivity as a proxy for tissue density. The CAT scan measures total x-ray absorption along each of many point-to-point lines through the patient's body. The tomographic algorithm uses the collection of these one-dimensional x-ray absorption measurements to estimate the x-ray absorptivity at many points inside the body. Then, the CAT scan machine displays those measurements in a two-dimensional depiction or a three dimensional, electronic model of the structures that absorbed the X-ray.

Referring again to FIG. 1, each of the paths 36, 38, 40, 42, 44, and 46 represents a single, one-dimensional measurement of the turbulence 30 in the atmosphere. These measurements may be adjusted to remove the effects of ionospheric scintillation and the movement of the transmitter or receiver. Also, the transmitting satellites 12, 14, 16, 18, and 20 and mobile platforms 22, 24, and 26 shown move thereby causing the signal paths to sweep through the atmosphere. The movement of the paths 36, 38, 40, 42, 44, and 46 allows many measurements of the turbulence 30 for any pair of one transmitter and one receiver. It should also be noted that the paths (not shown) between the ground station 28 represent a special case in which the paths move but pivot around one fixed end at the ground station 28. Since the turbulence 30 moves and evolves at a slower rate than the rapidly moving satellites 12, 14, 16, 18, and 20 and mobile platforms 22, 24, and 26, the measurements will remain valid for some time after they are taken. Further, since approximately 5,000 aircraft are aloft during a typical peak hour of flight time in the United States alone, and since there are at least 4 GPS satellites visible from any location, the system of FIG. 1 allows multiples of 20,000 measurements of the turbulence 30 over the United States during the hours of most interest for detecting turbulence 30. This rough estimate does not include many types of potential receivers (e.g. handheld receivers, marine vehicles, land vehicles, stations, and their equivalents) and many types of potential transmitters (e.g. other positioning system satellites, communication satellites and their equivalents) so the actual number of potential measurements is substantially greater the 20,000. All of these receivers (i.e. sampling nodes) are in communication with the processor 264 via the network. Since the processor 264 communicates via the network 262 its location is not critical and could even be onboard one of the mobile platforms or sampling nodes.

In operation, each sampling node continuously measures the tropospheric turbulence 30 along the line of sight from the node 22, 24, 26, or 28 to one, or more, of the transmitting satellites 12, 14, 16, 18, and 20. The sampling nodes 22, 24, 26, or 28 transmit their one-dimensional turbulence measurements, including the locations, directions, and times associated with each measurement to the processor 264. To build the model, the processor 264 examines the set of measurements and identifies points, or volumes, where turbulence 30 is present. FIG. 1 shows how this process operates on a relatively small sample of measurements. As illustrated, many of the paths 36, 38, 40, and 44 will miss any given turbule 30 in the atmosphere. However, other paths 42 and 46 will intersect the turbule 30 resulting in corresponding measurements that will be marked by a high degree of scintillation. By examining each of the many pairs of paths 36, 38, 40, 42, 44, and 46 to determine whether they intersect (or nearly intersect) and whether both paths exhibit high turbulence, the processor 264 identifies volumes of turbulence 30 at the intersection, or "near" intersection, of the pair of paths (here paths 42 and 46).

A near intersection means that the paths do not necessarily intersect, but rather, pass within a distance from each other on the scale of the turbules 30 of interest. Once a path intersection with high indications of turbulence on both of the paths is identified, additional paths that come near the first intersection can be examined to improve the identification and measurement of the turbulence 30. Other paths that intersect either of the first pair of intersecting paths 42 and 46 can be examined to confirm that the measured turbulence actually occurs at the intersection within the turbulence 30 rather than somewhere else along one of the intersecting paths 42 and 46. In other words, the fact that path 44 (for example) intersects path 46 but does not indicate turbulence, can be used to confirm that it is the intersection of path 46 with path 42 about which the turbulence 30 can be found. In a preferred embodiment, a program for creating the model is stored on a computer readable medium. The medium can be ROM, RAM, a hard drive, a CD, a floppy disk, flash memory, EPROM, mass storage, a network over which the program is transmitted, or any of their equivalents.

The sample of paths 36, 38, 40, 42, 44, and 46 shown in FIG. 1 is relatively small but represents a much larger number of paths that would preferably be used. However, the mobility of the transmitting satellites 12, 14, 16, 18 and 20 and sampling nodes 22, 24, 26, and 28 allows a large number of measurements to be made near the intersection of the two paths 42 and 46 because the paths 42 and 46 move while the multiple measurements are made. Further, because the paths 42 and 46 will continue to intersect the turbulent volume 30 for numerous measurements along each path 42 and 46, the processor can identify the location of the turbule 30 by comparing the paths 42 and 46 in the time period during which they neared each other (and the turbule 30 also). Thus, when the processor detects an intersection of paths each having high turbulence, the processor can confirm the existence of a turbule 30 and its location by looking backward (and forward) along the time series of measurements associated with the intersecting paths 42 and 46. As a result, the present disclosure allows for a rapid initial localization of turbules 30 followed by more thorough and accurate confirming checks of the initial estimate. Further, because each time series of measurements for a given path 36, 38, 40, 42, 44, and 46 over some time period can be treated statistically, the model can include a statistical confidence interval associated with the location of each turbule 30. Also, processing efficiency can be achieved by only comparing the paths 36, 38, 40, 42, and 46 that intersect over a given region and by not processing those path intersections that occur above the troposphere 32 or within the surface boundary layer.

Once the processor 264 builds (or modifies) the model, the network 262 can be used to distribute the model. Preferably, the network 262 includes a publisher-subscriber architecture that enables entities on the network 262 to subscribe to the model with the processor 264 serving as the publisher. In this manner, bandwidth requirements for distributing the turbulence model can be limited without compromising the quantity or quality of information being made available to the subscribers 272. Additionally, the model can be segmented according to pre-selected geographic areas over which the turbulence 30 occurs so that the subscribers 272 can subscribe to geographic subsets of the overall information contained in the model. The presence of GPS equipment already onboard many of the subscribers (e.g. aircraft that might also be measurement nodes) makes the implementation of location based subscription services easily achievable over the network 262. Additionally, conventional air-to-ground bidirectional communication systems (e.g. radios) can be used to relay turbulence related information between the components of the system. Thus, warnings of turbulence can be transmitted from the ground to aircraft in the vicinity of the turbulence other than the aircraft that measured the turbulence. If the aircraft that measured the turbulence might be affected by the turbulence onboard systems can communicate the turbulence information to the aircrew, or autopilot, so that appropriate evasive action can be initiated.

One type of subscriber 272 of particular interest is the Air Traffic Control (ATC) system 274 of the United States and its counterparts in other nations. The turbulence model can be distributed to the ATC system 274 where it can be further distributed to the Control Centers and Air Traffic Control Towers (ATCTs) for use in controlling air traffic. Another exemplary subscriber 272 is the National Weather Service which can make use of the model for predicting severe weather. In other preferred embodiments, the subscribers 272 can include display devices that allow tomographic turbulence information to be overlaid on navigation displays.

In other preferred embodiments, the processor can augment the model with data from other sources. For instance, the meteorological model 264 can provide estimates of the turbulence in volumes of the atmosphere where the signal paths between the transmitters and receivers have not swept for some time. Also, each aircraft (or mobile platform) that communicates with the system 200 will typically be outfitted with air data sensors 266. Because the air data sensors provide contemporaneous, localized, turbulence measurements, the air data sensors 266 can confirm, or augment, the information in the turbulence model. Another exemplary source of information is the inertial sensors 270 onboard the mobile platforms. Again these sensors 270 directly and contemporaneously measure turbulence that the system otherwise senses remotely. Likewise, the system 200 can augment the turbulence model with meteorological instruments 268 (e.g. weather stations) in areas prone to infrequent signal sweeps. Thus, the collection of sensors 266, 268, and 270 can be used to calibrate and adjust the model in addition to merely augmenting the information distributed via the model.

Figure 4:
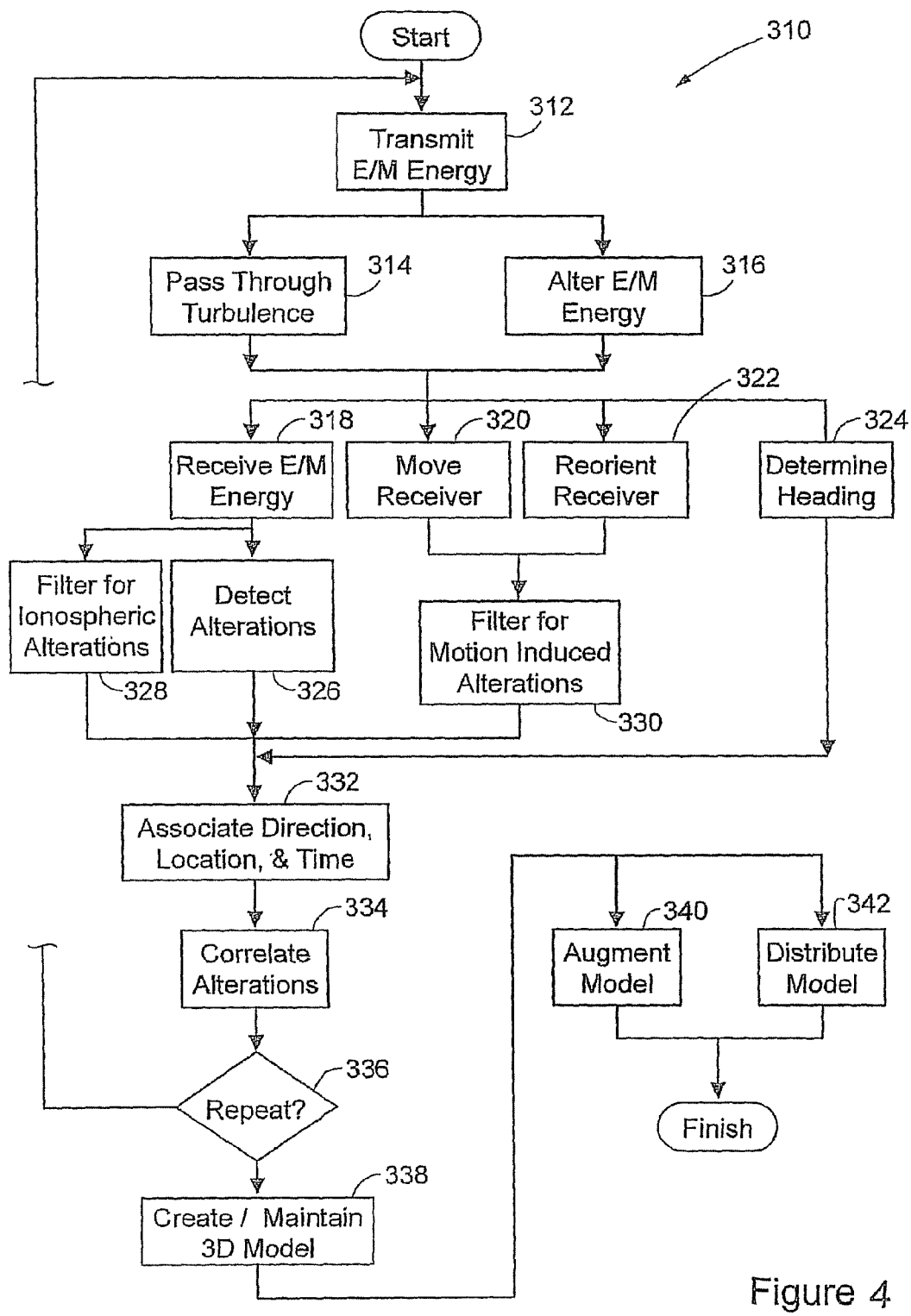
FIG. 4 illustrates a method in accordance with the principles of the present disclosure.

With reference now to FIG. 4, a method 310 in accordance with the principles of the present disclosure is illustrated. Generally, the method 310 includes receiving electromagnetic energy that has been altered by turbulence, detecting the alteration caused by the turbulence, and building a three-dimensional model of the turbulence. More particularly, FIG. 4 shows the energy being transmitted in operation 312 and encountering turbulence in operation 314 as it radiates from the transmitter. Because of the turbulence, the phase or the frequency of the energy shifts, or fading or enhancement occurs to the energy, as shown by the alteration in operation 316. In operation 318, the altered energy is received. Operations 324 and 326 show the receiver being moved and reoriented respectively while its heading and location are determined in operation 324. The alterations to the electromagnetic energy are shown as being detected in operation 322. Operation 328 shows ionospheric scintillation being filtered from the signal. Likewise, operation 330 removes the effects of receiver motion from the turbulence measurement. In operation 332 the direction, location, and time at which the energy was received are associated with the measurement of the turbulence. If the turbulence was measured at more than one location or time, the measurements can be correlated as in operation 334. Once enough measurements of the turbulence are gathered to allow for a statistically meaningful model (as indicated by operation 336), a three-dimensional model of the turbulence is created in operation 338. Additionally, the model can be augmented with other relevant information such as meteorological data or meteorological predictions in operation 340. Further, the turbulence model can be distributed to end users as shown by operation 342.

The embodiments were chosen and described in order to best explain the principles of the disclosure and its practical application to thereby enable others skilled in the art to best utilize the disclosure in various embodiments and with various modifications as are suited to the particular use contemplated.

As various modifications could be made in the constructions and methods described and illustrated without departing from the scope of the disclosure, it is intended that all matter contained in the description or shown in the accompanying drawings shall be interpreted as illustrative rather than limiting. For example, instead of merely avoiding turbulence, the detected turbulence can be used to advantage. In one exemplary embodiment, a mobile platform is positioned on the opposite side of the turbulence from a laser device to protect the mobile platform from the laser. Similarly, the mobile platform can maneuver so that a laser on board the mobile platform can hit a target despite the presence of the turbulence. Thus, the breadth and scope of the present disclosure should not be limited by any of the exemplary embodiments, but should be defined in accordance with the claims and their equivalents.

What is claimed is:

1. A method of predicting turbulence comprising:
   receiving electromagnetic energy that has traveled along a path subject to the turbulence, the turbulence altering the electromagnetic energy;
   determining a first alteration of the electromagnetic energy caused by the turbulence by filtering the electromagnetic energy as it was received along a first path of travel by a first mobile platform carrying a first receiver, at a first location, by using a velocity of one of a transmitter of the electromagnetic energy or the first receiver that received the electromagnetic energy;
   determining a second alteration of the electromagnetic energy caused by the turbulence by filtering the electromagnetic energy as it was received along a second path, non-parallel to the first path, by a second mobile platform carrying a second receiver, and operating at a second location, by using the velocity of one of the transmitter of the electromagnetic energy or the second receiver that received the electromagnetic energy; and
   using the determined first and second alterations to determine a zone where the turbulence is present and to create a three dimensional model of the turbulence in said zone.

2. The method according to claim 1, further comprising determining a direction between the first receiver and the transmitter.

3. The method according to claim 1, wherein the velocity between one of the first receiver and the transmitter includes at least one of a linear velocity or an angular velocity.

4. The method according to claim 1, the turbulence including an ionospheric turbulence and a tropospheric turbulence, the method further comprising using at least one of the first and second receivers to determine a portion of the alteration of the electromagnetic energy caused by the tropospheric turbulence.

5. The method according to claim 1, wherein using the first and second alterations to determine a zone where the turbulence is present comprises correlating the first alteration of the electromagnetic energy and the second alteration of the electromagnetic energy.

6. The method according to claim 5, further comprising the correlating including accounting for a time difference between the receiving of the electromagnetic energy at the first location and the receiving of the electromagnetic energy at the second location, the time difference being defined by the velocity and a distance between the first location and the second location.

7. The method according to claim 1, the receiving the electromagnetic energy by the first and second receivers further comprising being from a satellite.

8. The method according to claim 1, the determining the alteration of the electromagnetic energy by at least one of the receivers further comprising detecting at least one of a phase difference, an intensity difference, or a frequency difference.

9. The method according to claim 1, further comprising distributing the three dimensional model via a network.

10. The method according to claim 1 further comprising at least one of subscribing to or publishing the three dimensional model.

11. The method according to claim 1, further comprising determining a statistical confidence interval associated with the three dimensional model.

12. The method according to claim 1, further comprising augmenting the three dimensional model with a meteorological prediction.

13. The method according to claim 1, further comprising collecting turbulence data with a sensor in the turbulence and augmenting the three dimensional model with the data.

14. The method according to claim 1, wherein the turbulence is associated with an airport.

15. A method of predicting turbulence comprising:
    receiving electromagnetic energy that has traveled along a path subject to the turbulence, the turbulence altering the electromagnetic energy;
    determining the alteration caused by the turbulence by filtering the electromagnetic energy as it was received with a velocity of one of a transmitter of the electromagnetic energy or a receiver that received the electromagnetic energy; and
    creating a three dimensional model of the turbulence.

16. The method according to claim 15, wherein the three dimensional model is a tomographic model.

17. A method of predicting turbulence comprising:
    receiving electromagnetic energy that has traveled along a path subject to the turbulence, the turbulence altering the electromagnetic energy;
    determining the alteration caused by the turbulence by filtering the electromagnetic energy as it was received with a velocity of one of a transmitter of the electromagnetic energy or a receiver that received the electromagnetic energy;
    the velocity including at least one of a linear velocity or an angular velocity;
    determining a direction between the receiver and the transmitter; and
    creating a three dimensional model of the turbulence.

* * * * *